(12) United States Patent
Chang et al.

(10) Patent No.: US 11,126,152 B2
(45) Date of Patent: Sep. 21, 2021

(54) SMART CURTAIN SYSTEM AND METHOD OF ADJUSTING OPENING OF CURTAIN DYNAMICALLY

(71) Applicant: Chicony Power Technology Co., Ltd., New Taipei (TW)

(72) Inventors: Tse-Wen Chang, New Taipei (TW); Wen-Yen Cheng, New Taipei (TW); Shen-Min Yang, New Taipei (TW)

(73) Assignee: CHICONY POWER TECHNOLOGY CO., LTD., New Taipei (TW)

( * ) Notice: Subject to any disclaimer, the term of this patent is extended or adjusted under 35 U.S.C. 154(b) by 358 days.

(21) Appl. No.: 16/351,490

(22) Filed: Mar. 12, 2019

(65) Prior Publication Data

US 2020/0217132 A1 Jul. 9, 2020

(30) Foreign Application Priority Data

Jan. 9, 2019 (TW) ................................. 108100879

(51) Int. Cl.
  *G05B 15/02* (2006.01)
  *E06B 9/68* (2006.01)
  *H04L 12/28* (2006.01)

(52) U.S. Cl.
  CPC ................ *G05B 15/02* (2013.01); *E06B 9/68* (2013.01); *E06B 2009/6827* (2013.01);
  (Continued)

(58) Field of Classification Search
  CPC .............. E06B 2009/6818; E06B 9/68; E06B 2009/6827; A47H 2005/025; A47H 5/02;
  (Continued)

(56) References Cited

U.S. PATENT DOCUMENTS

| 7,383,148 B2 | 6/2008 | Ahmed |
| 7,512,450 B2 | 3/2009 | Ahmed |

(Continued)

FOREIGN PATENT DOCUMENTS

| CN | 101751015 A | 6/2010 |
| CN | 101999252 A | 3/2011 |

(Continued)

OTHER PUBLICATIONS

Office Action dated Sep. 25, 2019 of the corresponding Taiwan patent application No. 108100879.
(Continued)

*Primary Examiner* — Chun Cao
(74) *Attorney, Agent, or Firm* — Chun-Ming Shih; HDLS IPR Services

(57) ABSTRACT

A smart curtain system and a method of adjusting opening of curtain dynamically are provided. The system has a sensing apparatus, a control apparatus and a curtain apparatus. The sensing apparatus retrieves an environmental sensing parameter set. The control apparatus determines a parameter of insolation reaching indoor, a parameter of air-condition loading and a parameter of outputted illumination according to the environmental sensing parameter set, and generates a curtain control signal according to the parameter of insolation reaching indoor, the parameter of air-condition loading and the parameter of outputted illumination. The curtain apparatus adjusts a current opening of a curtain according to the curtain control signal for adjusting an area of obscured sunshine. The present disclosed example can effectively save energy, provide better indoor comfort, and improve user experience.

24 Claims, 7 Drawing Sheets

(52) U.S. Cl.
CPC ............... *G05B 2219/2642* (2013.01); *G05B 2219/2653* (2013.01); *H04L 12/2827* (2013.01)

(58) Field of Classification Search
CPC ............ G05B 15/02; G05B 2219/2642; G05B 2219/2653; H04L 12/2827
See application file for complete search history.

(56) References Cited

U.S. PATENT DOCUMENTS

| | | | |
|---|---|---|---|
| 7,548,833 B2 | 6/2009 | Ahmed | |
| 7,610,910 B2 | 11/2009 | Ahmed | |
| 9,529,345 B2 | 12/2016 | Cregg et al. | |
| 9,938,765 B2 | 4/2018 | Berman et al. | |
| 2007/0221824 A1* | 9/2007 | Melcher | G01V 8/22 250/208.1 |
| 2014/0163742 A1* | 6/2014 | Element | E06B 9/32 700/275 |
| 2015/0133043 A1 | 5/2015 | Patel et al. | |
| 2015/0160626 A1* | 6/2015 | Cregg | E06B 9/24 700/275 |
| 2015/0225999 A1* | 8/2015 | Berman | E06B 9/68 315/149 |
| 2019/0257686 A1* | 8/2019 | Popat | G01J 1/0474 |

FOREIGN PATENT DOCUMENTS

| | | |
|---|---|---|
| CN | 102597407 A | 7/2012 |
| CN | 103590738 A | 2/2014 |
| CN | 104834289 A | 8/2015 |
| CN | 103774973 B | 1/2016 |
| CN | 105629740 A | 6/2016 |
| CN | 106805714 A | 6/2017 |
| CN | 108267965 A | 7/2018 |
| CN | 106414888 B | 9/2018 |
| CN | 107615187 A | 10/2018 |
| CN | 108663941 A | 10/2018 |
| JP | 2017134818 A | 8/2017 |
| KR | 20160007469 A | 1/2016 |
| TW | 201537019 A | 10/2015 |
| TW | 201727422 A | 8/2017 |
| TW | M567603 | 10/2018 |
| WO | 2007092027 A2 | 8/2007 |
| WO | 2009136620 A1 | 11/2009 |
| WO | 2013039650 A1 | 3/2013 |

OTHER PUBLICATIONS

Office Action dated May 8, 2021 of the corresponding China patent application No. 201910073939.3.

* cited by examiner

SMART CURTAIN SYSTEM AND METHOD OF ADJUSTING OPENING OF CURTAIN DYNAMICALLY

BACKGROUND OF THE INVENTION

Field of the Invention

The technical field relates to curtain control and more particularly related to a smart curtain system and a method of adjusting opening of curtain dynamically.

Description of Related Art

In the current building design, for beauty and increasing field of vision and natural lighting, there are lots of glass windows installed in the building. Besides, there is a curtain installed beside each glass windows for adjusting the natural insolation reaching indoor.

However, the current curtains are usually unable to adjust their opening automatically, and the user must determine the intensity of outdoor sunlight by human eyes and adjust the opening of each curtain manually. Above status makes the user great inconvenience.

Besides, there is an electrically adjustable curtain system with a function of tracing sun. Above-mentioned electrically adjustable curtain system has an ability to automatically adjusting the opening of its curtain according to the current sun angle for automatically adjusting the natural insolation reaching indoor.

However, because the electrically adjustable curtain system of the related art adjusts the opening of the curtain only based on the current sun angle without fully considering that the natural insolation reaching indoor may affect the indoor status, such as reducing the indoor comfort, increasing the power energy consumption of temperature regulation equipment or lighting equipment, or the other status making the user have a poor user experience.

For example, when the opening of the curtain is too wide, there is too much natural insolation reaching indoor. This status makes the indoor too bright and provides the user with poor user experience, or the indoor temperature rises rapidly and the indoor comfort reduces rapidly. Moreover, it further makes the loading and the power energy consumption of the air-conditioning be increased additionally, that indoor temperature rising rapidly.

When the opening of the curtain is too narrow, there is too less natural insolation reaching indoor. This status makes the indoor too dark and the field of vision too narrow, and provides the user with poor user experience.

SUMMARY OF THE INVENTION

The main object of the present disclosed example is to provide a smart curtain system and a method of adjusting opening of curtain dynamically having an ability to dynamically adjusting the opening of the curtain according to the indoor status.

One of the exemplary embodiments, a smart curtain system comprises a sensing apparatus, a control apparatus, and a curtain apparatus. The sensing apparatus is used to retrieve a current environmental sensing parameter set, the sensing apparatus comprises a transmission unit used to transmit the environmental sensing parameter set to outside, the environmental sensing parameter set comprises at least one of a parameter of sunlight direction, a parameter of illumination, a parameter of outdoor temperature, a parameter of indoor temperature, a parameter of indoor brightness, and a parameter of depth of reached sunlight. The control apparatus is used to generate a curtain control signal according to the environmental sensing parameter set, the control apparatus comprises a transmission module and a process module. The transmission module is used to connect to the transmission unit of the sensing apparatus and receive the environmental sensing parameter set from the transmission unit of the sensing apparatus. The process module connected to the transmission module, comprises a module of computing insolation reaching indoor, a parameter of insolation reaching indoor, a module of computing air-condition loading, a module of computing outputted illumination, and a module of optimization control. The module of computing insolation reaching indoor is used to compute and determine a parameter of insolation reaching indoor according to the parameter of sunlight direction, the parameter of illumination and the parameter of depth of reached sunlight. The module of computing air-condition loading is used to compute and determine a parameter of air-condition loading according to the parameter of outdoor temperature, the parameter of indoor temperature and the parameter of insolation reaching indoor. The module of computing outputted illumination is used to compute and determine a parameter of outputted illumination according to the parameter of indoor brightness and the parameter of insolation reaching indoor. The module of optimization control is connected to the module of computing insolation reaching indoor, the module of computing air-condition loading, and the module of computing outputted illumination, the module of optimization control generates the curtain control signal according to the parameter of insolation reaching indoor, the parameter of air-condition loading, and the parameter of outputted illumination. The curtain apparatus is used to adjust a current opening of a curtain according to the curtain control signal, the curtain apparatus comprises a transmission device and a driving device. The transmission device is used to connect to the transmission module of the control apparatus and receive the curtain control signal from the transmission module of the control apparatus. The driving device is connected to the transmission device and the curtain and used to adjust the current opening of the curtain according to the curtain control signal for adjusting an area of obscured sunshine.

One of the exemplary embodiments, a method of adjusting opening of curtain dynamically is disclosed, the method is applied to a smart curtain system, the smart curtain system comprises a sensing apparatus, a curtain apparatus, and a control apparatus, the method comprises following steps: retrieving an environmental sensing parameter set by the sensing apparatus, wherein the environmental sensing parameter set comprises at least one of a parameter of sunlight direction, a parameter of illumination, a parameter of outdoor temperature, a parameter of depth of reached sunlight, a parameter of indoor brightness, and a parameter of indoor temperature; compute and determine a parameter of insolation reaching indoor according to the parameter of sunlight direction, the parameter of illumination and the parameter of depth of reached sunlight at the control apparatus; compute and determine a parameter of air-condition loading according to the parameter of outdoor temperature, the parameter of indoor temperature and the parameter of insolation reaching indoor; compute and determine a parameter of outputted illumination according to the parameter of indoor brightness and the parameter of insolation reaching indoor; and, adjusting a current opening of a curtain according to the parameter of insolation reaching indoor, the parameter of air-condition loading, and the parameter of outputted illumination.

The present disclosed example can effectively save energy, provide better indoor comfort, and improve user experience via dynamically adjusting the area of obscured sunshine simultaneously based on the sunlight condition, the air-conditioning loading and the indoor illumination status.

BRIEF DESCRIPTION OF DRAWING

The features of the present disclosed example believed to be novel are set forth with particularity in the appended claims. The present disclosed example itself, however, may be best understood by reference to the following detailed description of the present disclosed example, which describes an exemplary embodiment of the present disclosed example, taken in conjunction with the accompanying drawings, in which:

DETAILED DESCRIPTION OF THE INVENTION

In cooperation with attached drawings, the technical contents and detailed description of the present disclosed example are described thereinafter according to a preferable embodiment, being not used to limit its executing scope. Any equivalent variation and modification made according to appended claims is all covered by the claims claimed by the present disclosed example.

Figure 1:
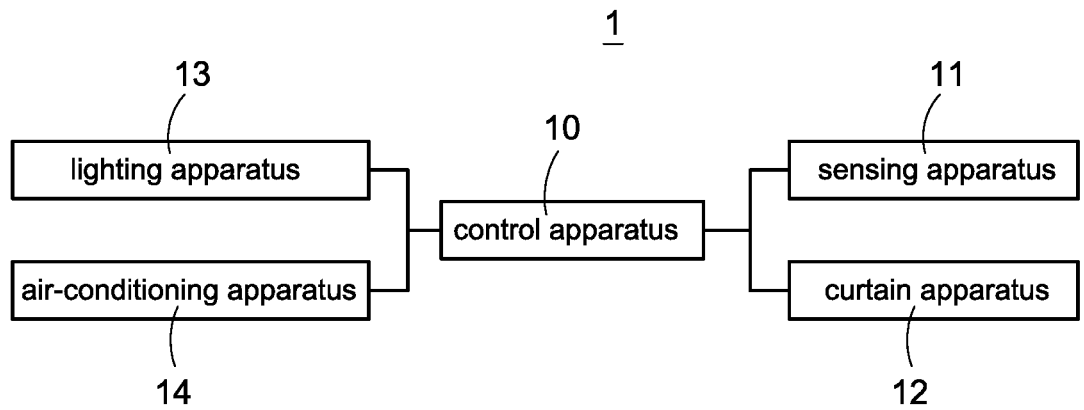
FIG. 1 is an architecture diagram of a smart curtain system according to an implement aspect of the present disclosed example.
Figure 2:
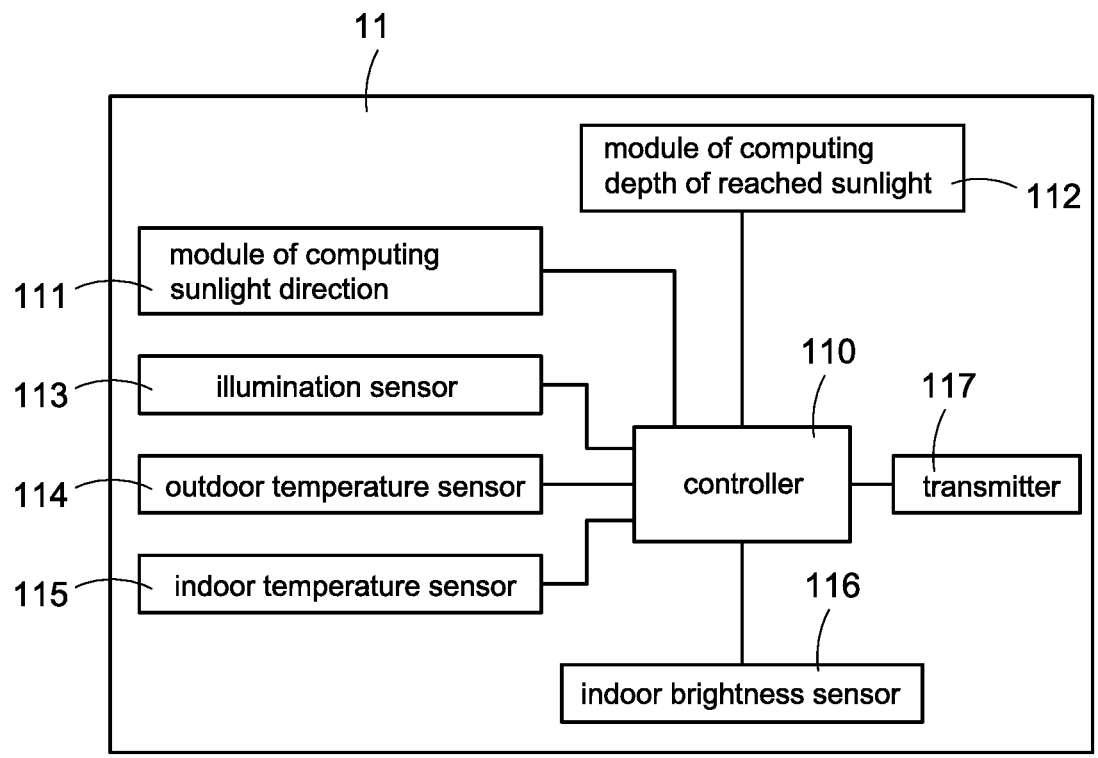
FIG. 2 is an architecture diagram of a sensing apparatus according to an implement aspect of the present disclosed example.
Figure 3:
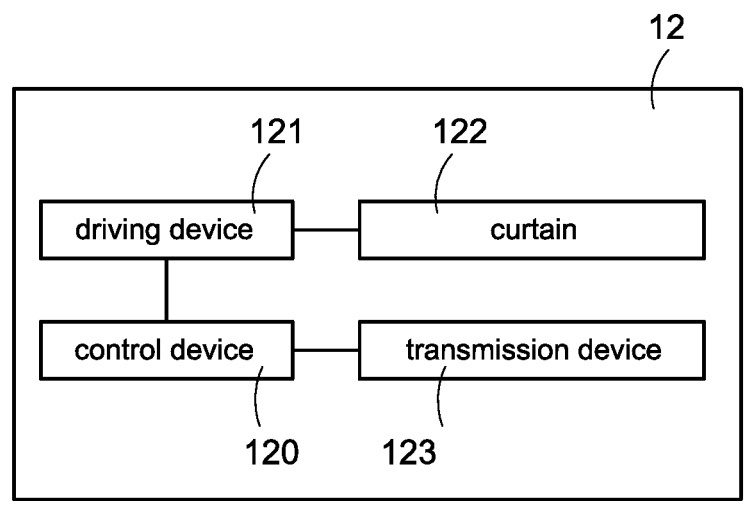
FIG. 3 is an architecture diagram of a curtain apparatus according to an implement aspect of the present disclosed example.
Figure 4:
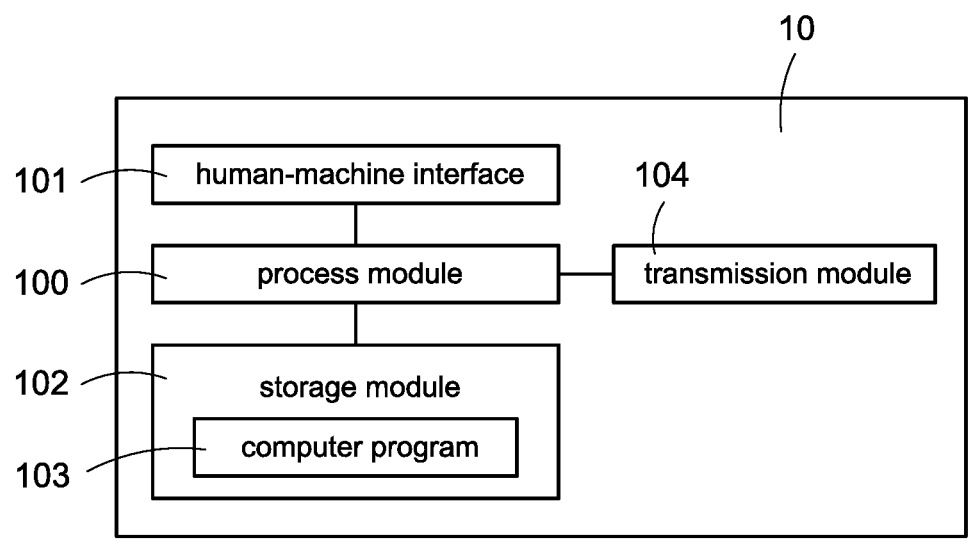
FIG. 4 is an architecture diagram of a control apparatus according to an implement aspect of the present disclosed example.

Please refer to FIG. 1 to FIG. 4 simultaneously, FIG. 1 is an architecture diagram of a smart curtain system according to an implement aspect of the present disclosed example, FIG. 2 is an architecture diagram of a sensing apparatus according to an implement aspect of the present disclosed example, FIG. 3 is an architecture diagram of a curtain apparatus according to an implement aspect of the present disclosed example, and FIG. 4 is an architecture diagram of a control apparatus according to an implement aspect of the present disclosed example.

As shown in figures, the present disclosed example discloses a smart curtain system 1, the smart curtain system 1 comprises a sensing apparatus 11, a curtain apparatus 12, a lighting apparatus 13, an air-conditioning apparatus 14, and a control apparatus 10 connected to above apparatuses (such as connecting by a signal transmission cable or network) and having an ability to communicate with each apparatus.

More specifically, in addition to continuously monitor the environmental status (such as the environmental sensing parameter set described below) by the sensing apparatus 11, the control apparatus 10 of the smart curtain system 1 may further continuously monitor the status of the lighting apparatus 13 (such as the parameter of outputted illumination described below) and the status of the air-conditioning apparatus 14 (such as the parameter of air-condition loading described below). Then, according to the retrieved data, the control apparatus 10 may determine how to adjust the curtain apparatus 12 for adjusting the natural insolation reaching indoor.

One of the exemplary embodiments, the control apparatus 10 is connected to a gateway (not shown in figures) by network, and is indirectly connected to above-mentioned apparatuses 11-14 by the gateway.

As shown in FIG. 2, the sensing apparatus 11 may sense the environment which the sensing apparatus 11 is currently located for generating the environmental sensing parameter set at the current time. More specifically, the sensing apparatus 11 may comprises one or more type(s) of devices of retrieving environmental sensing parameter, a transmitter 117 and a controller 110 electrically connected to above devices.

Each device for retrieving environmental sensing parameter is used to retrieve the different parameter of the environmental sensing parameter set, the transmitter 117 is used to connect to one or more external apparatus(es) (such as the transmission module 104 of the control apparatus 10) for communication, and the controller 110 is used to control the sensing apparatus 11.

One of the exemplary embodiments, the devices of retrieve environmental parameter may comprise a module of computing sunlight direction 111, a module of computing depth of reached sunlight 112, an illumination sensor 113, an outdoor temperature sensor 114, an indoor temperature sensor 115, and/or an indoor brightness sensor 116. The environmental sensing parameter set may comprise a parameter of sunlight direction, a parameter of illumination, a parameter of outdoor temperature, a parameter of indoor temperature, a parameter of indoor brightness, and/or a parameter of depth of reached sunlight. Above-mentioned devices of retrieve environmental parameter are respectively used to retrieve above-mentioned parameters.

One of the exemplary embodiments, any of above-mentioned devices of retrieve environmental parameter may be an environmental sensor, so as to sense the designated environmental condition, such as sensing and determining the parameter of sunlight direction, sensing and determining the parameter of depth of reached sunlight, sensing and determining the parameter of illumination of sunlight, sensing and determining the parameter of indoor temperature, or sensing and determining the parameter of indoor brightness.

One of the exemplary embodiments, any of above-mentioned devices of retrieve environmental parameter may be a computation module, so as to compute the corresponding environmental condition according to the reference data, such as calculating and deciding the parameter of sunlight direction according to an installation position of the curtain apparatus 12, a current time, and variation data of sun trajectories, calculating and deciding the parameter of depth of reached sunlight according to the user input, calculating and deciding the parameter of illumination according to a weather status and the parameter of sunlight direction, calculating and deciding the parameter of indoor temperature according to the parameter of outdoor temperature and a status history of the air-conditioning apparatus 14, or calculating and deciding the parameter of indoor brightness according to a status of the lighting apparatus 13.

As shown in FIG. 3, the curtain apparatus 12 may comprises a driving device 121, a curtain 122, a transmission device 123 and a control device 120 electrically connected to above devices.

The driving device 121 (may comprise a motor, a gear set, a lifting structure and/or the other driving components) is used to be controlled to adjust an opening of the curtain 122. The transmission device 123 is used to connect to the external apparatuses (such as the transmission module 104 of the control apparatus 10) for communication. The control device 120 is used to control the curtain apparatus 12, such as controlling the driving device 121 to adjust the current opening of the curtain 122 according to a curtain control signal.

Figure 9:
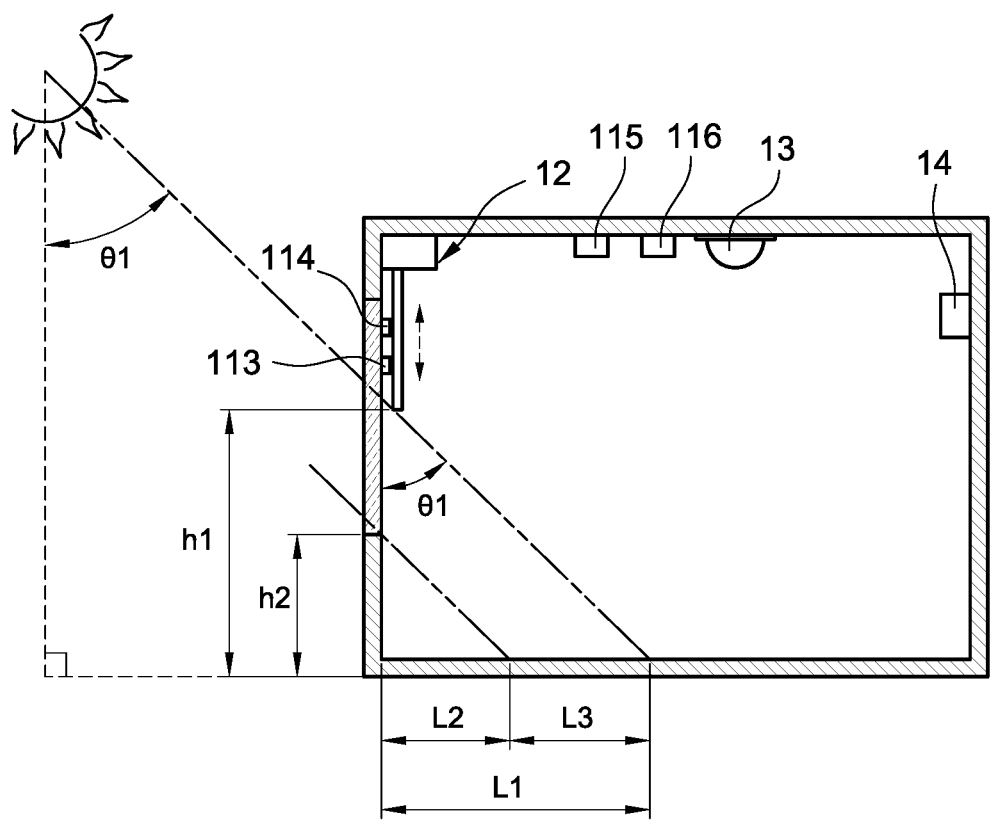
FIG. 9 is a schematic view of a smart curtain system according to an implement aspect of the present disclosed example.

One of the exemplary embodiments, the curtain 122 is a vertical curtain (as shown in FIG. 9, such as a vertical blind), the driving device 121 may lift the curtain 122 up or down for adjusting the depth of insolation reaching indoor and the range of the field of vision.

As shown in FIG. 4, the control apparatus 10 may comprise a human-machine interface 101, a storage module 102, a transmission module 104 and a process module 100 electrically connected to above components.

The human-machine interface 101 (such as keyboard, mouse, touchscreen or the other input devices and/or screen, speaker or the other output devices) is used to accept the user operation and provide information to the user. The storage module 102 is used to store data. The transmission module 104 is used to connect to the external apparatuses 11-14 for communication. The process module 100 is used to control the control apparatus 10 and may further control the other apparatuses 11-14.

One of the exemplary embodiments, the storage module 102 may comprise a non-transitory computer-readable media, the non-transitory computer-readable media stores a computer program 103 (such as firmware, application program, or operating system of the control apparatus 10). The computer program 103 records a plurality of computer-executable codes. The process module 100 may implement each step of the method of adjusting opening of curtain dynamically of the present disclosed example by execution of the computer-executable codes.

Figure 5:
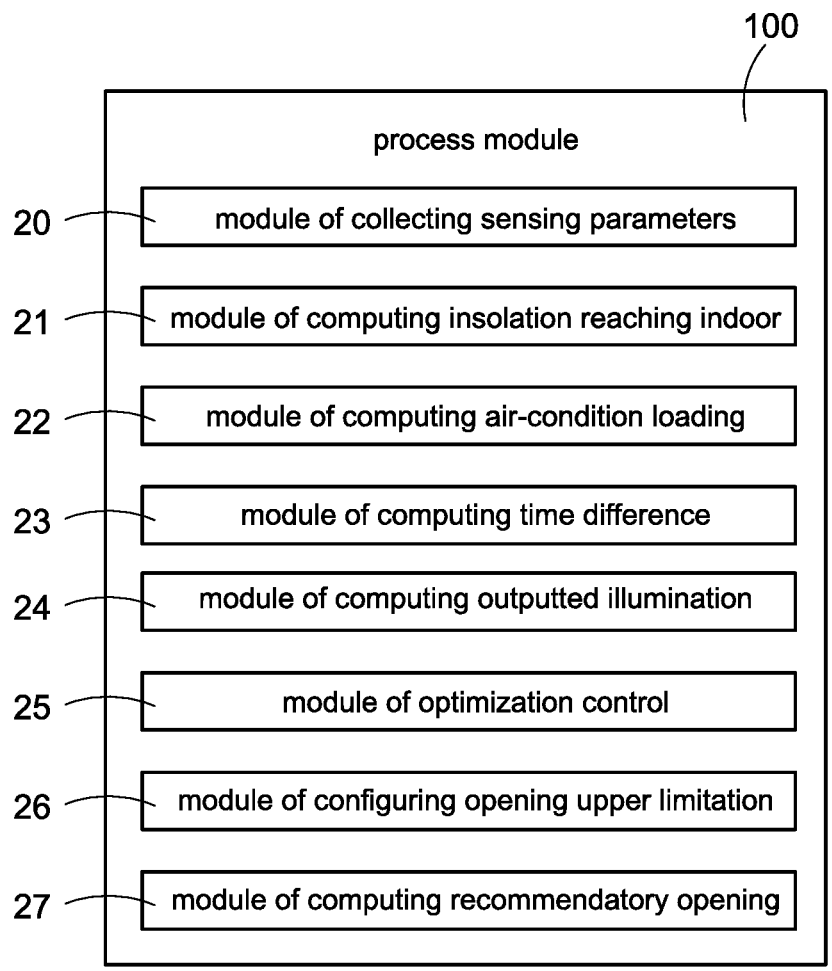
FIG. 5 is an architecture diagram of a process module according to an implement aspect of the present disclosed example.

Please refer to FIG. 5 simultaneously, which is an architecture diagram of a process module according to an implement aspect of the present disclosed example. More specifically, the process module 100 mainly implement each function of the method of adjusting opening of curtain dynamically of the present disclosed example via the execution of the computer-executable codes, but this specific example is not intended to limit the scope of the present disclosed example. One of the exemplary embodiments, the module 20-27 described below may be the circuit modules, such as the electronic circuits or the digital circuits.

According to the different functions, above-mentioned computer-executable codes or circuit modules may be divided into following function modules connected (circuit modules) or linked (software module) to each other:

1. A module of collecting sensing parameters 20 being configured to retrieve the environmental sensing parameter set;

2. A module of computing insolation reaching indoor 21 being configured to compute and determine the parameter of insolation reaching indoor according to the parameter of sunlight direction, the parameter of illumination, and the parameter of depth of reached sunlight;

3. A module of computing air-condition loading 22 being configured to compute and determine the parameter of air-condition loading according to the parameter of outdoor temperature, the parameter of indoor temperature, and the parameter of insolation reaching indoor;

4. A module of computing time difference 23 being configured to compute the solar time;

5. A module of computing outputted illumination 24 being configured to compute and determine the parameter of outputted illumination according to the parameter of indoor temperature and the parameter of insolation reaching indoor;

6. A module of optimization control 25 being configured to generate the curtain control signal according to the parameter of insolation reaching indoor, the parameter of air-condition loading, and the parameter of outputted illumination;

7. A module of configuring opening upper limitation 26 being configured to compute and determine the opening upper limitation of the curtain; and 8. A module of computing recommendatory opening 27 being configured to compute and determine the recommendatory opening of the curtain.

Please be noted that although the embodiment of FIG. 5 and the following description take each function module 20-27 being installed in the process module 100 for the explanation, but this specific example is not intended to limit the scope of the present disclosed example.

One of the exemplary embodiments, each function module 20-27 may be separately installed in that the controller 110 of the sensing apparatus 11, the control device 120 of the curtain apparatus 12 and the process module 100 of the control apparatus 10 according to the user's requirement.

One of the exemplary embodiments, the smart curtain system 1 may be without the control apparatus 10, and any combination of the controller 110 of the sensing apparatus 11, the control device 120 of the curtain apparatus 12, a controller of the lighting apparatus 13 and a controller of the air-conditioning apparatus is integrated to implement each function which the control apparatus 10 is achievable.

Figure 6:
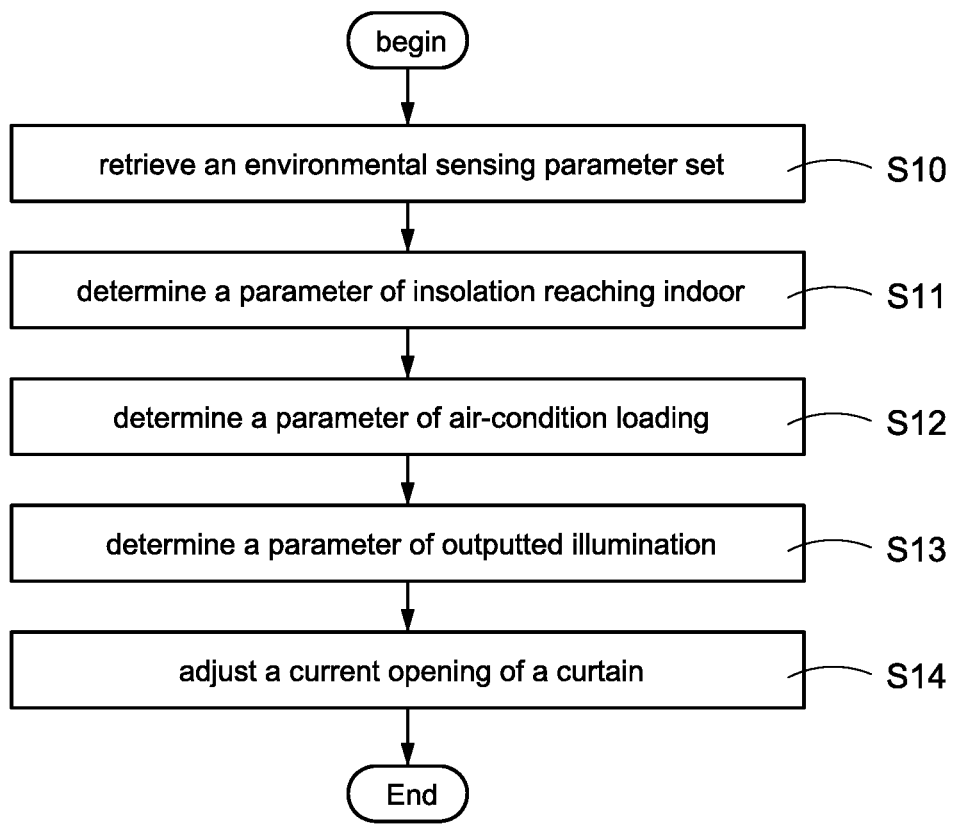
FIG. 6 is a flowchart of a method of adjusting opening of curtain dynamically according to a first embodiment of the present disclosed example.

Please refer to FIG. 6 simultaneously, which is a flowchart of a method of adjusting opening of curtain dynamically according to a first embodiment of the present disclosed example. The method of adjusting opening of curtain dynamically of this embodiment comprises following steps.

Step S10: the process module 100 of the control apparatus 10 runs the module of collecting sensing parameters 20 to retrieve the environmental sensing parameter set at the current time by the sensing apparatus 11.

More specifically, the environmental sensing parameter set may comprise a parameter of sunlight direction, a parameter of illumination, a parameter of outdoor temperature, a parameter of depth of reached sunlight, a parameter of indoor temperature, and a parameter of indoor brightness. The parameter of sunlight direction is used to express a current sun orientation. The parameter of illumination is used to express a sunlight illumination irradiating the glass windows. The parameter of outdoor temperature is used to express a temperature of outdoor (or the glass windows). The parameter of depth of reached sunlight may be configured by the user or be a system default parameter, and is used to express a depth of sunlight reaching indoor which the user expects. The parameter of indoor temperature is used to express an indoor temperature. The parameter of indoor brightness is used to express an indoor brightness.

Step S11: the process module 100 runs the module of computing insolation reaching indoor 21 to compute and determine the parameter of insolation reaching indoor at the control apparatus 10 according to the parameter of sunlight direction, the parameter of illumination, and the parameter of depth of reached sunlight.

One of the exemplary embodiments, the process module 100 may determine the (range or maximum value of) natural insolation having an ability to reach indoor according to the parameter of sunlight direction, the parameter of illumination, and the parameter of depth of reached sunlight.

For example, the process module 100 may compute to obtain one of following results and make the result as the parameter of insolation reaching indoor:

The insolation reaching indoor being zero if the curtain 122 is fully closed;

The insolation reaching indoor being "⅓*the maximum natural insolation" if the curtain 122 is opened to one-third tomes the opening of the maximum opening; and The insolation reaching indoor being "1*the maximum natural insolation" if the curtain 122 is fully opened.

Step S12: the process module 100 runs the module of computing air-condition loading 22 to compute and determine the parameter of air-condition loading according to the parameter of outdoor temperature, the parameter of indoor temperature, and the parameter of insolation reaching indoor.

One of the exemplary embodiments, the process module 100 may compute and determine the reducible air-condition loadings respectively in the different openings of the curtain 122 (for example, the reducible loading of the air-condition apparatus 14 for keeping the indoor temperature comfortable after reducing the natural insolation reaching indoor) according to the parameter of outdoor temperature, the parameter of indoor temperature, and the parameter of insolation reaching indoor. Moreover, the process module 100 may further compute the reducible power energy consumption caused by each reduced loading.

For example, the process module 100 may compute to obtain one of following results and make the result as the parameter of air-condition loading:

The reduced loading of the air-conditioning apparatus 14 being "1*the maximum reducible air-condition loading" and the reduced power energy consumption of the air-conditioning apparatus 14 being "1*the maximum reducible air-condition loading*A power energy consumption index of the air-conditioning apparatus 14" if the curtain 122 is fully closed;

The reduced loading of the air-conditioning apparatus 14 being "⅔*the maximum reducible air-condition loading" and the reduced power energy consumption of the air-conditioning apparatus 14 being "⅔*the maximum reducible air-condition loading*the power energy consumption index of the air-conditioning apparatus 14" if the curtain 122 is opened to one-third times the opening of the maximum opening;

The reduced loading of the air-conditioning apparatus 14 being "⅓*the maximum reducible air-condition loading" and the reduced power energy consumption of the air-conditioning apparatus 14 being "⅓*the maximum reducible air-condition loading*the power energy consumption index of the air-conditioning apparatus 14" if the curtain 122 is opened to two-thirds times the opening of the maximum opening; and The air-conditioning apparatus 14 being unable to reduce both the reduced loading and the reduced power energy consumption if the curtain 122 is fully opened.

One of the exemplary embodiments, the process module 100 may calculate the air-condition loading by a formula (1) below:

$$Q_{total} = Q_{convection} + Q_{radiation} = \\ \{hA(T_{glass} - T_{room}) + \varepsilon \sigma A[(273.15 + T_{glass})^4 - \\ (273.15 + T_{room})^4]\} \times 37/3516,$$ formula (1)

wherein $Q_{total}$ is a total of air conditioning load; $Q_{convection}$ is an air conditioning loading caused by thermal convection; $Q_{radiation}$ is an air conditioning loading caused by heat radiation; h is a coefficient of natural air heat convection, such as 12 W/m$^2$; A is a glass area of the glass windows (such as 88.5 m$^2$); $T_{glass}$ is an outdoor temperature (or a temperature sensed in the glass windows); $T_{room}$ is an indoor temperature (such as 24 degrees Celsius); ε is an emissivity of surface radiation, is usually 0.72; ε is a constant, 5.67× 10$^{-8}$ W/M$^2$K$^4$.

Step S13: the process module 100 runs the module of computing outputted illumination 24 to compute and determine the parameter of outputted illumination according to the parameter of indoor brightness and the parameter of insolation reaching indoor.

One of the exemplary embodiments, the process module 100 may compute and determine a plurality of increasable lighting efficiency respectively in the different openings of the curtain 122 (for example, the reducible power energy consumption of the lighting apparatus 13 after increasing the natural insolation reaching indoor to replace the artificial lighting) according to the parameter of indoor brightness and the parameter of insolation reaching indoor.

For example, the process module 100 may compute to obtain one of following results and make the result as the parameter of outputted illumination:

The lighting apparatus 13 being unable to reduce the power energy consumption if the curtain 122 is fully closed;

The reduced power energy consumption of the lighting apparatus 13 being "⅓*a maximum reducible lighting power energy consumption" if the curtain 122 is opened to one-third times the opening of the maximum opening;

The reduced power energy consumption of the lighting apparatus 13 being "⅔*the maximum reducible lighting power energy consumption" if the curtain 122 is opened to two-thirds times the opening of the maximum opening; and The reduced power energy consumption of the lighting apparatus 13 being "1*the maximum reducible lighting power energy consumption" if the curtain 122 is fully opened.

Step S14: the process module 100 runs the module of optimization control 25 to adjust the current opening of the curtain 122 of the curtain apparatus 12 according to the parameter of insolation reaching indoor, the parameter of air-condition loading, and the parameter of outputted illumination.

One of the exemplary embodiments, the process module 100 compares the parameters of insolation reaching indoor, the parameters of air-condition loading and the parameters of outputted illumination respectively corresponding to the different openings, and determines the curtain opening having an ability to make the indoor status be the best or save the most power energy consumption.

Take determining the curtain opening having the ability to save the most power energy consumption for example, the process module 100 may computer and determine following results:

The reducible power energy consumption being "1*the maximum reducible air-condition loading" if the curtain 122 is fully closed;

The reducible power energy consumption being "(⅓*the maximum reducible lighting power energy consumption)+ (⅔*the maximum reducible air-condition loading)" if the curtain 122 is opened to one-third times the opening of the maximum opening;

The reducible power energy consumption being "(⅔*the maximum reducible lighting power energy consumption)+ (⅓*the maximum reducible air-condition loading)" if the curtain 122 is opened to two-thirds times the opening of the maximum opening; and The reducible power energy consumption being "1*the maximum reducible lighting power energy consumption" if the curtain 122 is fully opened.

Then, the process module selects the curtain opening (recommendatory opening) having the ability to save the most power energy consumption, generates the corresponding curtain control signal, and sends the curtain control signal to the curtain apparatus 12. Thus, the control device 120 of the curtain apparatus 12 controls the driving device 121 to adjust the current opening of the curtain 122 to the recommendatory opening according to the curtain control signal.

Thus, the present disclosed example can prevent that too much or too less insolation from reaching indoor via determining the opening of the curtain simultaneously based on the sunlight condition, the air-conditioning loading and the indoor illumination status for dynamically adjusting the area of obscured sunshine obscured by the curtain, so as to effectively save energy, provide better indoor comfort, and improve user experience.

For example, when the sunlight is weak or indirect insolation, the present disclosed example can appropriately increase the natural insolation reaching indoor and control the lighting apparatus 13 to reduce the lighting brightness (namely, reducing the artificial lighting), so as to reduce the power energy consumption of the lighting apparatus 13. Moreover, the present disclosed example can provide the user the better visual feeling because of increasing the proportion of natural lighting (with softer light).

When the sunlight is stronger or direct insolation, the present disclosed example can appropriately reduce the natural insolation reaching indoor for preventing the indoor temperature from rising rapidly and preventing the air-conditioning apparatus 14 from increasing loading, so as to reduce the power energy consumption of the air-conditioning apparatus 14. Moreover, the present disclosed example can provide the user the better comfort and better environmental user experience via keeping the indoor temperature stable.

Please be noted that the present disclosed example may perform above-mentioned steps S10-S14 repeatedly to dynamically adjust the current opening of the curtain 122 with the variations of sunlight, illumination, and air-conditioning, and continuedly provide the user better comfort and better environmental user experience.

One of the exemplary embodiments, the storage module 102 of the control apparatus 10 may store one or more update condition(s), such as each time 30 minutes elapsing, a variation of indoor temperatures exceeding a threshold, a variation of the illuminations exceeding a threshold and so on. The control apparatus 10 is configured to perform above-mentioned steps S10-S14 when any of the update condition(s) is fulfilled. Namely, the control apparatus 10 controls the sensing apparatus 11 to retrieve the new environmental sensing parameter set at the current time again, determines the new parameter of insolation reaching indoor, the new parameter of air-condition loading, and the new parameter of outputted illumination, generates the new curtain control signal according to the new parameter of insolation reaching indoor, the new parameter of air-condition loading, and the new parameter of outputted illumination, and controls the curtain apparatus 12 to adjust the current opening of the curtain according to the new curtain control signal.

Figure 7:
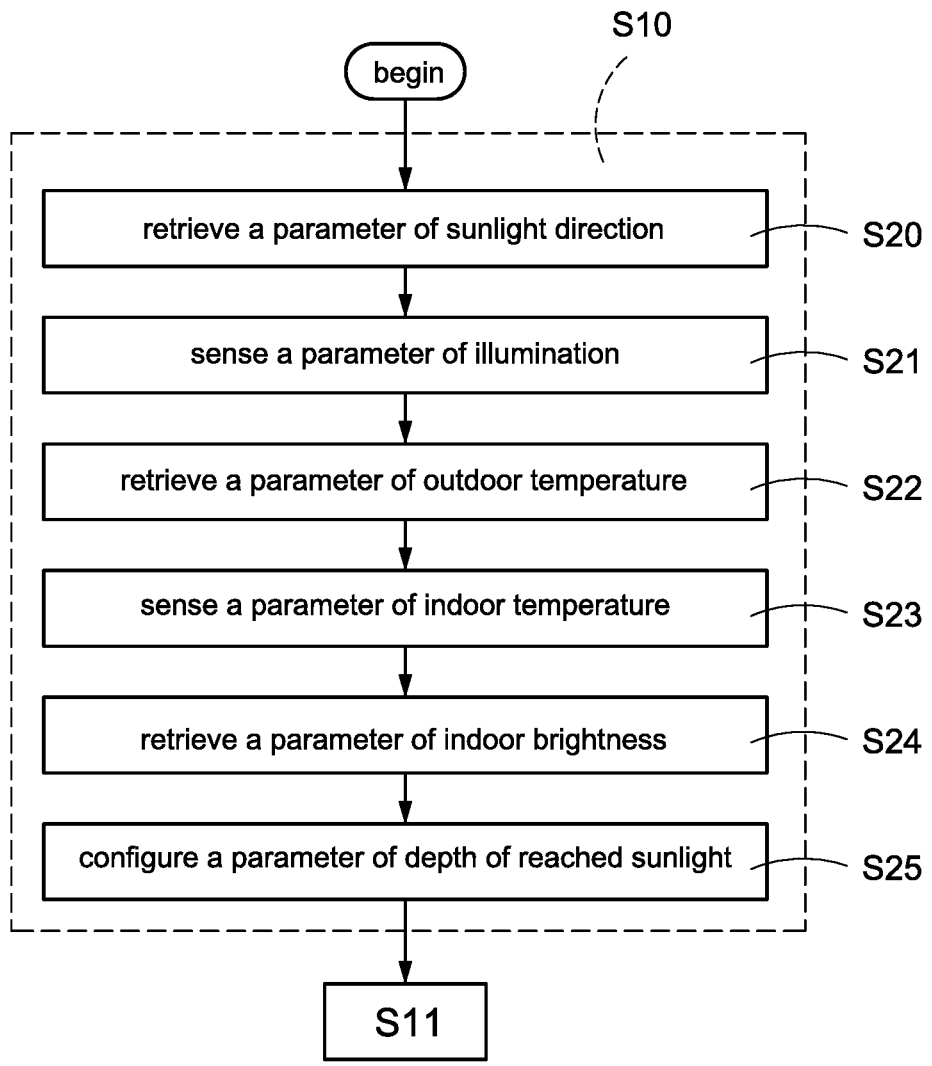
FIG. 7 is a flowchart of retrieving an environmental sensing parameter set according to a second embodiment of the present disclosed example.

Please refer to FIG. 6 and FIG. 7 simultaneously, FIG. 7 is a flowchart of retrieving an environmental sensing parameter set according to a second embodiment of the present disclosed example. Compare to the method of adjusting opening of curtain dynamically of FIG. 6, the step S10 of the method of adjusting opening of curtain dynamically of this embodiment comprises following steps.

Step S20: the process module 100 of the control apparatus 10 computes and determines the parameter of sunlight direction according to the installation position of the curtain apparatus 12, the current time, and the variation data of sun trajectories.

One of the exemplary embodiments, the process module 100 runs the module of computing time difference 23 to calculate the solar time according to the current time, calculates and determines the parameter of sunlight direction according to the installation position of the curtain apparatus 12, the solar time, and the variation data of sun trajectories.

One of the exemplary embodiments, the process module 100 calculates the solar time by following formulas (2)-(4):

$$T_{sol} = T_{loc} + \left(\frac{E_t + T_e}{60}\right)(\text{hr}) \qquad \text{formula (2)}$$

$$E_t = 9.87 \times \text{Sin}2\beta - 7.53 \times \text{Cos}\beta - 1.5 \times \text{Sin}\beta(\text{min}) \qquad \text{formula (3)}$$

$$T_e = \frac{\theta_{longitude}}{15} \times 60(\text{min}), \qquad \text{formula (4)}$$

wherein Tsol is the solar time; Tloc is the current time; Et is the mean equation of time between solar time and clock time; Te is the geographical equation of time;

$$\beta = 360 \times \frac{(n-81)}{364}$$

expresses that a ranking of the year which the current day is; θlongitude is deflection of longitude (deflection of vertical) in the time zone.

Step S21: the process module 100 controls the illumination sensor 113 to sense the parameter of illumination, such as sensing the glass illumination value of the glass windows.

Step S22: the process module 100 controls the outdoor temperature sensor 114 to sense the parameter of outdoor temperature. One of the exemplary embodiments, the outdoor temperature sensor 114 is installed on/beside the glass windows, and has an ability to sense the glass temperature as the parameter of outdoor temperature.

Thus, the outdoor temperature sensor 114 is not necessary to be installed on outdoor, so as to reduce the damage probability of the outdoor temperature sensor 114.

Step S23: the process module 100 controls the indoor temperature sensor 115 to sense the parameter of indoor temperature.

Step S24: the process module 100 controls the indoor brightness sensor 116 top sense the parameter of indoor brightness, or determines the parameter of indoor brightness according to the operation parameter of the lighting apparatus 13.

Step S25: the process module 100 receives the user input by the human-machine interface 101, and configures the parameter of depth of reached sunlight (such as 50 centimeters) according to the user input. Namely, the user may input the depth of sunlight reaching indoor which the user expects.

Thus, the present disclosed example can effectively collect the environmental sensing parameter set.

Figure 8:
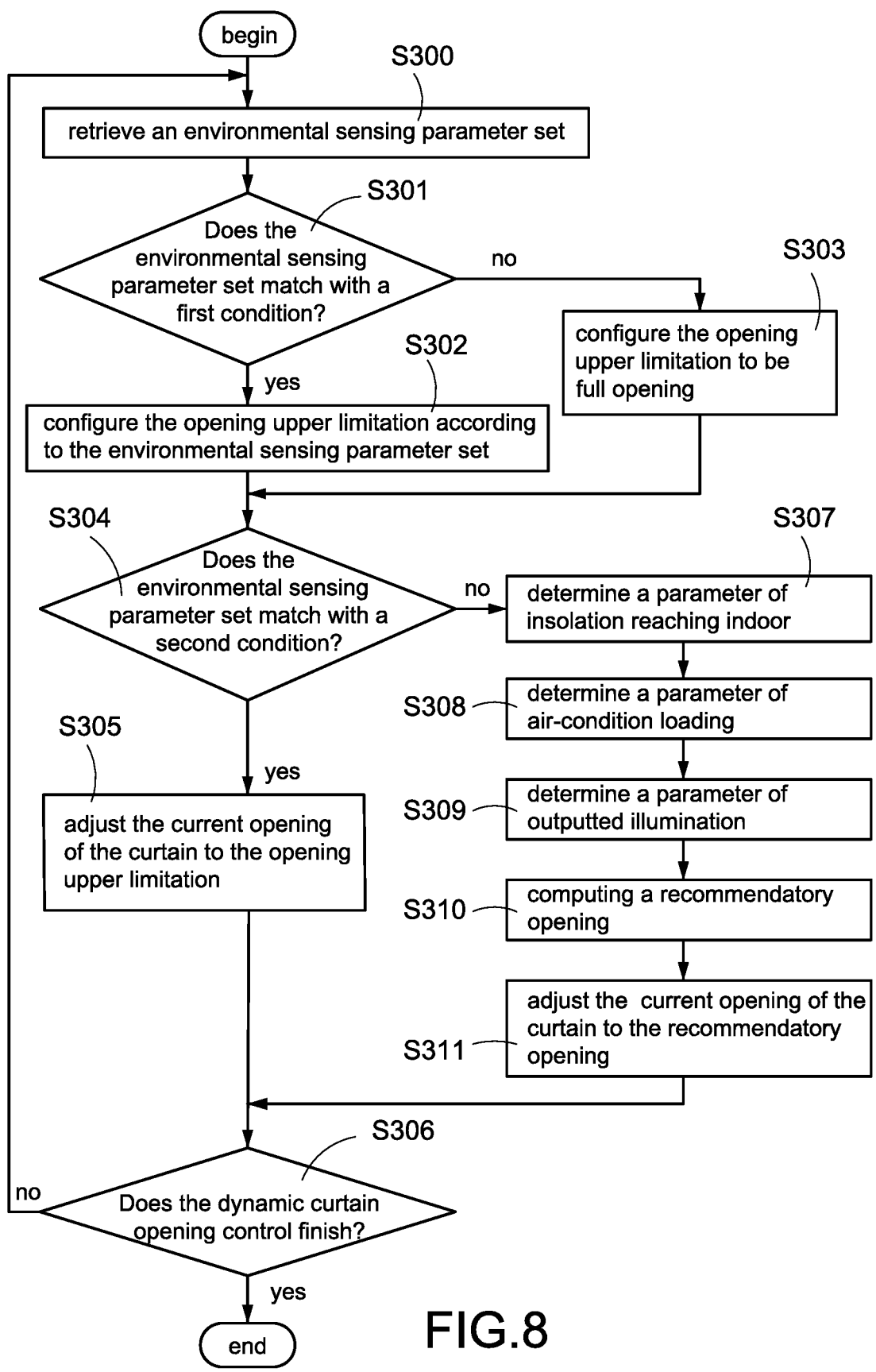
FIG. 8 is a flowchart of a method of adjusting opening of curtain dynamically according to a third embodiment of the present disclosed example.

Please refer to FIG. 8 simultaneously, which is a flowchart of a method of adjusting opening of curtain dynamically according to a third embodiment of the present disclosed example; and the method of adjusting opening of curtain dynamically of this embodiment comprises following steps.

Step S300: the process module 100 of the control apparatus 10 retrieves the environmental sensing parameter set corresponding to the current time by the sensing apparatus 11.

Step S301: the process module 100 determines whether the retrieved environmental sensing parameter set matches with the first condition configured in advance.

One of the exemplary embodiments, the first condition may comprise the parameter of illumination being greater than the illumination threshold (the illumination threshold may be configured to be not less than 8000 lumens), and/or determining according to the parameter of sunlight direction that the curtain 122 faces to a surface being directly insolated by sunlight.

Please be noted that the present disclosed example can determine whether the insolation is too strong via determining according to the parameter of sunlight direction whether the curtain 122 faces to a surface being directly insolated by sunlight. Moreover, the present disclosed example can estimate the current weather status (such as whether it's sunny) and further determine whether the current insolation is too strong via determining whether the parameter of illumination is greater than the illumination threshold.

For example, when the curtain 122 faces to the surface of sunlight directly insolating and the parameter of illumination is greater than the illumination threshold, the process module 100 may determine that the current weather is sunny and the current insolation is too strong. Thus, the insolation reaching indoor will be too much if the curtain 122 is fully opened. When the curtain 122 faces to the surface of sunlight directly insolating, but the parameter of illumination is not greater than the illumination threshold, the process module 100 may determine that the current weather is rainy or cloudy and the current insolation is not too strong. Thus, the insolation reaching indoor will not be too much if the curtain 122 is fully opened.

If the process module 100 determines that the environmental sensing parameter set matches with the first condition, the process module 100 performs the step S302: the process module 100 running the module of configuring opening upper limitation 26 to configure an opening upper limitation according to the parameter of depth of reached sunlight configured by the user.

For example, if the parameter of depth of reached sunlight configured by the user is 30 centimeters, the process module 100 may calculate the corresponding lifting upper limitation (such as lifting the curtain up for 20 centimeters to make the depth of reached sunlight be 30 centimeter) according to the parameter of depth of reached sunlight. and configure the lifting upper limitation as the opening upper limitation.

Thus, during the present disclosed example adjusting the curtain opening follow-up, the current opening of the curtain will not be greater than the configured opening upper limitation, and the depth of reached sunlight will not exceed the parameter of depth of reached sunlight configured by the user.

If the process module 100 determines that the environmental sensing parameter set doesn't match with the first condition, the process module 100 performs the step S303: the process module 100 running the module of configuring opening upper limitation 26 to configure the opening upper limitation of the curtain 122 to be full opening. In other words, when follow-up adjusting the current opening of the curtain 122, the current opening may be arbitrarily adjusted to any opening between fully opening to fully closing.

Step S304: the process module 100 determines whether the environmental sensing parameter set matches with the second condition configured in advance.

One of the exemplary embodiments, the second condition may comprise the parameter of outdoor temperature being less than an outdoor temperature threshold or the parameter of indoor temperature being less than an indoor temperature threshold. Above-mentioned outdoor temperature threshold and indoor temperature threshold may be less than 22 degrees Celsius.

Please be noted that the present disclosed example can determine that the current temperature is too low if determining that the parameter of outdoor temperature is less than an outdoor temperature threshold or the parameter of indoor temperature is less than an indoor temperature threshold, and make a lot of insolation reach indoor. After a lot of insolation reaching indoor, the present disclosed example can prevent the user from getting a bad temperature feeling caused by the indoor temperature rising too high.

If the process module 100 determines that the environmental sensing parameter set matches with the second condition, the process module 100 may perform step S305: the process module 100 adjusting the current opening of the curtain of the curtain apparatus 12 to the previously configured opening upper limitation (such as configuring in step S302 or step S303) for reducing the area of obscured sunshine and introducing more insolation.

Step S306: the process module 100 determines whether the dynamic opening control of the curtain is finished, such as determining whether the user turns the function of dynamic opening control of the curtain off or shuts the curtain apparatus 12 power down.

If the process module 100 determines the dynamic opening control of the curtain is not finished, the process module 100 performs step S300 again. Otherwise, the process module 100 finishes the dynamic opening control of the curtain.

If the process module 100 determines the environmental sensing parameter set doesn't match with the second condition, the process module 100 may perform steps S307-S311 for adjusting the current opening of the curtain 122 of the curtain apparatus 12 according to the parameter of insolation reaching indoor, the parameter of air-condition loading, and the parameter of outputted illumination.

Steps S307 to S309 shown in this figure are respectively the same or similar as steps S10 to S13 shown in FIG. 6, the relevant description is omitted for brevity.

Then, the process module 100 performs step S310: the process module 100 running the module of computing recommendatory opening 27 to calculate the recommendatory opening according to the parameter of insolation reaching indoor, the parameter of air-condition loading, and the parameter of outputted illumination, such as the recommendatory opening having an ability to save the most power energy consumption or make the indoor status be best.

Step S311: the process module 100 adjusts the current opening of the curtain 122 of the curtain apparatus 12 to the recommendatory opening. More specifically, the process module 100 may generate the corresponding curtain control signal and send the curtain control signal to the curtain apparatus 12. The control device 120 of the curtain apparatus 12 controls the driving device 121 to adjust the current opening to the recommendatory opening according to the curtain control signal.

Please refer to FIG. 1 to FIG. 5 and FIG. 9 simultaneously, FIG. 9 is a schematic view of a smart curtain system according to an implement aspect of the present disclosed example. FIG. 9 is used to explain how to calculate the depth of reached sunlight (namely the depth L3) which is the same as the parameter of depth of reached sunlight configured by the user.

As shown in the figure, in this example, the curtain apparatus 12 is an electrically adjustable vertical roller blind curtain. An illumination sensor 113 and an outdoor temperature sensor 114 are installed on the glass windows. An indoor temperature sensor 115, an indoor brightness sensor, a lighting apparatus 13 and an air-conditioning apparatus 14 are installed in the indoor space. The curtain apparatus 12 is configured to lifting the curtain 122 to adjust the depth of reached sunlight (namely depth L3). An irradiation angle of sunlight is θ1, namely, the angle between the sunlight and ground is 90-θ1.

More specifically, the control apparatus 10 may calculate the solar time corresponding to the current time (such as clock time) according to above-mentioned formulas (2)-(4), search and determine the current solar zenith angle, and calculate the depth L3 according to following formulas (5)-(8):

$$Cos\theta 1 = Cos\lambda \times Cos\delta \times Cos\omega + Sin\lambda \times Sin\delta \quad \text{formula (5)}$$

$$Sin\varphi_s = \frac{Cos\delta \times Cos\omega}{Sin\theta_1} \quad \text{formula (6)}$$

$$\tan(\varphi_s - 90) = \frac{L_2}{h_1} = \frac{L_1}{h_2} \quad \text{formula (7)}$$

$$L_3 = L_1 - L_2 \,(\text{cm}), \quad \text{formula (8)}$$

wherein θ1 is the solar zenith angle; $\varphi_s$–90 is the sun elevation angle; λ is the latitude of the architectural coordinates; ω is the hour angle; δ is the solar declination; L1 is the distance (depth) between the window sill of the building and the deepest of insolation reaching; L2 is the depth obscured by the window sill; L3 is the depth of sunlight reaching indoor; h1 is the sum of the height of windows sill of the building and the height of the glass which is not obscured by the curtain 122; h2 is the height of the window sill.

Furthermore, the control apparatus 10 may calculate the opening of the curtain 122 according to the formula "h1–h2", and make the calculated opening correspond to the current depth of reached sunlight L3.

Thus, the present disclosed example can generate a relationship between the different openings of the curtain 122, the different depths of reached sunlight, and the different time, and accurately make the current depths of reached sunlight match with the depths of reached sunlight L3 required by the user.

The above-mentioned are only preferred specific examples in the present disclosed example, and are not thence restrictive to the scope of claims of the present disclosed example. Therefore, those who apply equivalent changes incorporating contents from the present disclosed example are included in the scope of this application, as stated herein.

What is claimed is:

1. A smart curtain system, comprising:
a sensing apparatus used to retrieve a current environmental sensing parameter set, the sensing apparatus comprising a transmission unit used to transmit the environmental sensing parameter set to outside, the environmental sensing parameter set comprising at least one of a parameter of sunlight direction, a parameter of illumination, a parameter of outdoor temperature, a parameter of indoor temperature, a parameter of indoor brightness, and a parameter of depth of reached sunlight;
a control apparatus used to generate a curtain control signal according to the environmental sensing parameter set, the control apparatus comprising:
a transmission module used to connect to the transmission unit of the sensing apparatus and receive the environmental sensing parameter set from the transmission unit of the sensing apparatus; and
a process module connected to the transmission module, comprising:
a module of computing insolation reaching indoor used to compute and determine a parameter of insolation reaching indoor according to the parameter of sunlight direction, the parameter of illumination and the parameter of depth of reached sunlight;
a module of computing air-condition loading used to compute and determine a parameter of air-condition loading according to the parameter of outdoor temperature, the parameter of indoor temperature and the parameter of insolation reaching indoor;
a module of computing outputted illumination used to compute and determine a parameter of outputted illumination according to the parameter of indoor brightness and the parameter of insolation reaching indoor; and
a module of optimization control connected to the module of computing insolation reaching indoor, the module of computing air-condition loading, and the module of computing outputted illumination, the module of optimization control generating the curtain control signal according to the parameter of insolation reaching indoor, the parameter of air-condition loading, and the parameter of outputted illumination; and
a curtain apparatus used to adjust a current opening of a curtain according to the curtain control signal, the curtain apparatus comprising:

a transmission device used to connect to the transmission module of the control apparatus and receive the curtain control signal from the transmission module of the control apparatus; and a driving device connected to the transmission device and the curtain and used to adjust the current opening of the curtain according to the curtain control signal for adjusting an area of obscured sunshine.

2. The smart curtain system according to claim 1, wherein the current opening is not less than an opening upper limitation; the control apparatus configures the opening upper limitation to be a full opening when the environmental sensing parameter set doesn't match with a first condition.

3. The smart curtain system according to claim 2, wherein the first condition comprises the parameter of illumination being greater than an illumination threshold and determining according to the parameter of sunlight direction that the curtain faces to a surface being directly insolated by sunlight.

4. The smart curtain system according to claim 3, wherein the illumination threshold is not less than 8000 lumens.

5. The smart curtain system according to claim 2, wherein the control apparatus configures the opening upper limitation according to the parameter of depth of reached sunlight when the environmental sensing parameter set matches with the first condition.

6. The smart curtain system according to claim 1, wherein the control apparatus generates the curtain control signal according to the parameter of insolation reaching indoor, the parameter of air-condition loading, and the parameter of outputted illumination when the environmental sensing parameter set doesn't match with a second condition.

7. The smart curtain system according to claim 6, wherein the control apparatus generates the curtain control signal corresponding to an opening upper limitation when the environmental sensing parameter set matches with the second condition; the curtain apparatus adjust the current opening of the curtain to the opening upper limitation according to the curtain control signal.

8. The smart curtain system according to claim 7, wherein the second condition comprises the parameter of outdoor temperature being less than an outdoor temperature threshold or the parameter of indoor temperature being less than an indoor temperature threshold.

9. The smart curtain system according to claim 8, wherein the outdoor temperature threshold or the indoor temperature threshold is less than 22 degrees Celsius.

10. The smart curtain system according to claim 6, wherein the module of optimization control is configured to compute a recommendatory opening according to the parameter of insolation reaching indoor, the parameter of air-condition loading, and the parameter of outputted illumination when the environmental sensing parameter set doesn't match with the second condition and generate the curtain control signal corresponding to the recommendatory opening; the curtain apparatus adjust the curtain to the recommendatory opening according to the curtain control signal.

11. The smart curtain system according to claim 1, wherein the sensing apparatus comprises:

a module of computing sunlight direction used to compute and determine the parameter of sunlight direction according to an installation position of the curtain apparatus, a current time, and variation data of sun trajectories;

an illumination sensor used to sense illumination of sunlight for generating the parameter of illumination;

an outdoor temperature sensor used to sense the parameter of outdoor temperature;

an indoor temperature sensor used to sense the parameter of indoor temperature;

an indoor brightness sensor used to sense the parameter of indoor brightness; and a module of computing depth of reached sunlight used to configure the parameter of depth of reached sunlight according to a user input.

12. The smart curtain system according to claim 1, wherein when an update condition is fulfilled, the sensing apparatus is configured to retrieve the environmental sensing parameter set corresponding to the current time again, the control apparatus is configured to generate the curtain control signal according to the environmental sensing parameter set corresponding to the current time again, and the curtain apparatus is configured to adjust the current opening of the curtain according to the curtain control signal again.

13. A method of adjusting opening of curtain dynamically, the method being applied to a smart curtain system, the smart curtain system comprising a sensing apparatus, a curtain apparatus, and a control apparatus, the method comprising following steps implemented by execution of computer-executable codes of a computer program stored in a non-transitory computer-readable media of the control apparatus:

a) retrieving an environmental sensing parameter set by the sensing apparatus, wherein the environmental sensing parameter set comprises at least one of a parameter of sunlight direction, a parameter of illumination, a parameter of outdoor temperature, a parameter of depth of reached sunlight, a parameter of indoor brightness, and a parameter of indoor temperature;

b) compute and determine a parameter of insolation reaching indoor according to the parameter of sunlight direction, the parameter of illumination and the parameter of depth of reached sunlight at the control apparatus;

c) compute and determine a parameter of air-condition loading according to the parameter of outdoor temperature, the parameter of indoor temperature and the parameter of insolation reaching indoor;

d) compute and determine a parameter of outputted illumination according to the parameter of indoor brightness and the parameter of insolation reaching indoor; and e) at the control apparatus, generating a curtain control signal according to the parameter of insolation reaching indoor, the parameter of air-condition loading, and the parameter of outputted illumination, and transmitting the curtain control signal to the curtain apparatus through signal transmission cable network to control the curtain apparatus to adjust a current opening of a curtain.

14. The method of adjusting opening of curtain dynamically according to claim 13, wherein the current opening is not less than an opening upper limitation; the method further comprises a step f) before the step e) configuring the opening upper limitation to be a full opening when the environmental sensing parameter set doesn't match with a first condition.

15. The method of adjusting opening of curtain dynamically according to claim 14, wherein the first condition comprises the parameter of illumination being greater than an illumination threshold and determining according to the parameter of sunlight direction that the curtain faces to a surface being directly insolated by sunlight.

16. The method of adjusting opening of curtain dynamically according to claim 15, wherein the illumination threshold is not less than 8000 lumens.

17. The method of adjusting opening of curtain dynamically according to claim 15, further comprising a step g) before the step e) configuring the opening upper limitation according to the parameter of depth of reached sunlight when the environmental sensing parameter set matches with the first condition.

18. The method of adjusting opening of curtain dynamically according to claim 13, wherein the step e) is configured to adjust the current opening of the curtain according to the parameter of insolation reaching indoor, the parameter of air-condition loading, and the parameter of outputted illumination when the environmental sensing parameter set doesn't match with a second condition.

19. The method of adjusting opening of curtain dynamically according to claim 18, further comprising a step h) adjusting the current opening of the curtain to an opening upper limitation when the environmental sensing parameter set matches with the second condition.

20. The method of adjusting opening of curtain dynamically according to claim 18, wherein the second condition comprises the parameter of outdoor temperature being less than an outdoor temperature threshold or the parameter of indoor temperature being less than an indoor temperature threshold.

21. The method of adjusting opening of curtain dynamically according to claim 20, wherein the outdoor temperature threshold or the indoor temperature threshold is less than 22 degrees Celsius.

22. The method of adjusting opening of curtain dynamically according to claim 18, wherein the step e) comprises following steps:
 e1) computing a recommendatory opening according to the parameter of insolation reaching indoor, the parameter of air-condition loading, and the parameter of outputted illumination when the environmental sensing parameter set doesn't match with the second condition; and
 e2) adjusting the current opening of the curtain of the curtain apparatus to the recommendatory opening.

23. The method of adjusting opening of curtain dynamically according to claim 13, wherein the step a) comprises following steps:
 a1) computing and determining the parameter of sunlight direction according to an installation position of the curtain apparatus, a current time, and variation data of sun trajectories;
 a2) sensing the parameter of illumination by an illumination sensor;
 a3) sensing the parameter of outdoor temperature by an outdoor temperature sensor;
 a4) sensing the parameter of indoor temperature by an indoor temperature sensor;
 a5) sensing the parameter of indoor brightness by an indoor brightness sensor or computing and determining the parameter of indoor brightness according to an operation parameter of a lighting device; and
 a6) configuring the parameter of depth of reached sunlight according to a user input.

24. The method of adjusting opening of curtain dynamically according to claim 13, further comprising a step i) performing the step a) to the step e) again when an update condition is fulfilled.

* * * * *